United States Patent
Wang et al.

(10) Patent No.: US 10,589,480 B2
(45) Date of Patent: Mar. 17, 2020

(54) METHOD AND DEVICE FOR MAKING NET POINT OF LIGHT GUIDE PLATE

(71) Applicant: TALANT OPTRONICS (SUZHOU) CO., LTD., Suzhou (CN)

(72) Inventors: Jian Wang, Suzhou (CN); Shuiyin Wang, Suzhou (CN)

( * ) Notice: Subject to any disclaimer, the term of this patent is extended or adjusted under 35 U.S.C. 154(b) by 219 days.

(21) Appl. No.: 15/683,796

(22) Filed: Aug. 23, 2017

(65) Prior Publication Data
US 2019/0054708 A1 Feb. 21, 2019

(30) Foreign Application Priority Data
Aug. 18, 2017 (CN) .......................... 2017 1 0712362

(51) Int. Cl.
| B29D 11/00 | (2006.01) |
| B29C 59/04 | (2006.01) |
| B29C 59/02 | (2006.01) |
| F21V 8/00 | (2006.01) |

(52) U.S. Cl.
CPC ...... B29D 11/00721 (2013.01); B29C 59/022 (2013.01); B29C 59/04 (2013.01); B29D 11/00288 (2013.01); B29D 11/00663 (2013.01); G02B 6/0065 (2013.01);
(Continued)

(58) Field of Classification Search
CPC ........ B29D 11/00721; B29D 11/00288; B29D 11/00663; B29C 59/04; B29C 59/022
See application file for complete search history.

(56) References Cited

U.S. PATENT DOCUMENTS

| 2008/0251956 A1* | 10/2008 | Korhonen ................. B31F 1/07 264/1.9 |
| 2011/0156293 A1* | 6/2011 | Lin .......................... B29C 59/04 264/1.27 |
| 2014/0098566 A1* | 4/2014 | Starkey ................. G02B 5/0221 362/611 |

FOREIGN PATENT DOCUMENTS

| CN | 101078796 A | 11/2007 |
| CN | 102673876 A | 1/2013 |
| CN | 102914813 A | 2/2013 |

(Continued)

OTHER PUBLICATIONS

CN First Office Action dated Apr. 1, 2019 in the corresponding CN application (application No. 201710712362.7).

*Primary Examiner* — Mathieu D Vargot
(74) *Attorney, Agent, or Firm* — Kilpatrick Townsend & Stockton, LLP

(57) ABSTRACT

A method for manufacturing netted dots on a light guide plate is disclosed, including: engraving, on a surface of a metal plate with a preset roughness, a female mould or a male mould corresponding to a shape of the netted dots on the light guide plate; coating the metal plate onto a surface of a roller; heating the roller so that a temperature of the metal plate rises to a preset temperature; adjusting a distance of a center of the roller in relation to a light guide plate feeding passage so that the metal plate applies a preset pressure onto the light guide plate to be machined; and making the light guide plate to be machined pass through the light guide plate feeding passage, wherein the metal plate transfer-prints a shape of netted dots of the female mould or the male mould onto the light guide plate to be machined at a preset pressure and a preset temperature to form the netted dots on the light guide plate. A device for manufacturing netted dots on a light guide plate is also disclosed.

13 Claims, 3 Drawing Sheets

(52) U.S. Cl.
CPC .... *B29C 2059/023* (2013.01); *B29K 2905/12* (2013.01); *G02B 6/0043* (2013.01)

(56) References Cited

FOREIGN PATENT DOCUMENTS

| | | |
|---|---|---|
| CN | 203792714 U | 8/2014 |
| CN | 104842550 A | 8/2015 |
| CN | 106772765 A | 5/2017 |
| JP | 2005103947 A | 4/2005 |

\* cited by examiner

METHOD AND DEVICE FOR MAKING NET POINT OF LIGHT GUIDE PLATE

FIELD

The present disclosure relates to the field of lighting, and more particularly, to a light guide plate in an LED.

BACKGROUND

The design of a light guide plate originates from a liquid crystal display screen of a notebook computer. A light guide plate may transform a line light source into an area light source. The light guide plate takes an optical grade acrylic (PMMA) or PC as a substrate. Light enters the light guide plate from an incident surface of the light guide plate, and scatters at netted dots on the light guide plate so that the light is uniformly distributed. FIG. 1 illustrates a cross sectional structure of a light guide plate prepared by the existing technology. As viewed from the microstructure, circular or oval convex points are provided on the surface of the light guide plate. The outer diameter of the convex points is in a range between 40 μm and 60 μm. The light guide plate may be prepared by a hot pressing process.

In the process of realizing the traditional technology, the inventor found out that the following technical problems.

When preparing a light guide plate that is normal in size, a hot pressing device is required to have a pressure of up to six tons, and a hot pressing component of a hot pressing device is required to have a temperature of up to 140° C., in order to prepare the foregoing convex points that meet requirements. In this case, the service life of the hot pressing device is significantly decreased. Meanwhile, as the pressure increases and the temperature rises, the qualification rate of the light guide plate prepared is decreased by 10%.

SUMMARY

Based on the above, it is necessary to provide a solution to the technical problem that both the service life of the hot pressing device and the qualification rate of the light guide plate are low in the preparation of the above-mentioned light guide plate.

An objective of the present disclosure is to provide a method for manufacturing netted dots on a light guide plate. The method including: engraving, on a surface of a metal plate with a preset roughness, a female mould or a male mould corresponding to a shape of the netted dots on the light guide plate; coating the metal plate onto a surface of a roller; heating the roller so that a temperature of the metal plate rises to a preset temperature; adjusting a distance of a center of the roller in relation to a light guide plate feeding passage so that the metal plate applies a preset pressure onto the light guide plate to be machined; and making the light guide plate to be machined pass through the light guide plate feeding passage, wherein the metal plate transfer-prints a shape of netted dots of the female mould or the male mould onto the light guide plate to be machined at a preset pressure and a preset temperature so as to form the netted dots on the light guide plate.

Moreover, another objective of the present disclosure is to provide a device of manufacturing netted dots on a light guide plate.

The device includes: a hollow roller, adapted to be filled with oil, provided with a heating unit; and a metal plate coated onto a surface of the roller, wherein a female mould or a male mould corresponding to a shape of the netted dots on the light guide plate is engraved on a surface of the metal plate; wherein there are two rollers, the two rollers are stacked, and a light guide plate feeding passage is formed between the two rollers; and wherein at least one of the two rollers is provided with a lifting unit configured to adjust a spacing of the light guide plate feeding passage.

With respect to the above method and device for manufacturing the netted dots on the light guide plate, a female mould or a male mould corresponding to the shape of the netted dots on the light guide plate is engraved on the surface of the metal plate, and the metal plate is coated on the surfaces of the upper and lower rollers. When the temperature of the above two rollers rises to a preset temperature, and the light guide plate passes through a reserved passage between two rollers, the light guide plate is impressed to form netted dots on the light guide plate at a preset temperature and a preset pressure. Such technical method of impressing a light guide plate with a hot pressing process has drastically enhanced production efficiency as compared with the traditional injection molding process in the past. As to the netted dots on the light guide plate as formed by such technical process, a laser processing speed is improved, and the service life of the device and the machined steel plate is also increased dramatically.

DETAILED DESCRIPTION OF PREFERRED EMBODIMENTS

To make the object, the technical solution and the advantages of the present disclosure clearer, the technical solution of the present disclosure will be described clearly and fully hereunder in combination with the specific embodiments and the corresponding drawings of the disclosure. Obviously, the described embodiments are merely part of the embodiments in the present disclosure rather than all the embodiments. Based on the embodiments of the present disclosure, all the other embodiments obtained by a person with ordinary skill in the art without making creative efforts pertain to the protection scope of the disclosure.

As illustrated in FIGS. 1-6, in one embodiment, a method for manufacturing netted dots on a light guide plate is provided. The method may include the following steps.

In step S100, a female mould or a male mould corresponding to a shape of the netted dots on the light guide plate may be engraved on a surface of a metal plate with a preset roughness.

The preset roughness of the surface of the metal plate is generally in the range between Ra6.3 and Ra12.5. The netted dots on the surface of the metal plate are obtained by engraving. The female mould may be a concave split mould, and the male mould may be a convex split mould. The female mould may be obtained by compressing and polishing the metal plate, and the male mould may be obtained by compressing and polishing the parts other than the required split mould.

In one embodiment, the metal plate may be used to engrave the netted dots on the light guide plate 320, and the female mould or the male mould engraved on the metal plate may be used to transfer-press the light guide plate 320.

Specifically, the metal plate may be a steel plate or a metal plate made of other materials, and the engraving may be laser engraving. The netted dots of the female mould or the male mould on the metal plate machined by laser may have a cross-sectional shape including two sharp teeth B and A and a concave arc D provided between two sharp teeth.

In another embodiment, after the female mould or the male mould on the metal plate has been machined by laser, the female mould or the male mould on the metal plate may be continued to be machined by electroplating.

Further, in one embodiment, the netted dots of the female mould or the male mould on the electroplated metal plate may have a cross-sectional shape includes two grooves B1 and A1 and a parabolic curve D1 provided between two grooves.

Figure 1:
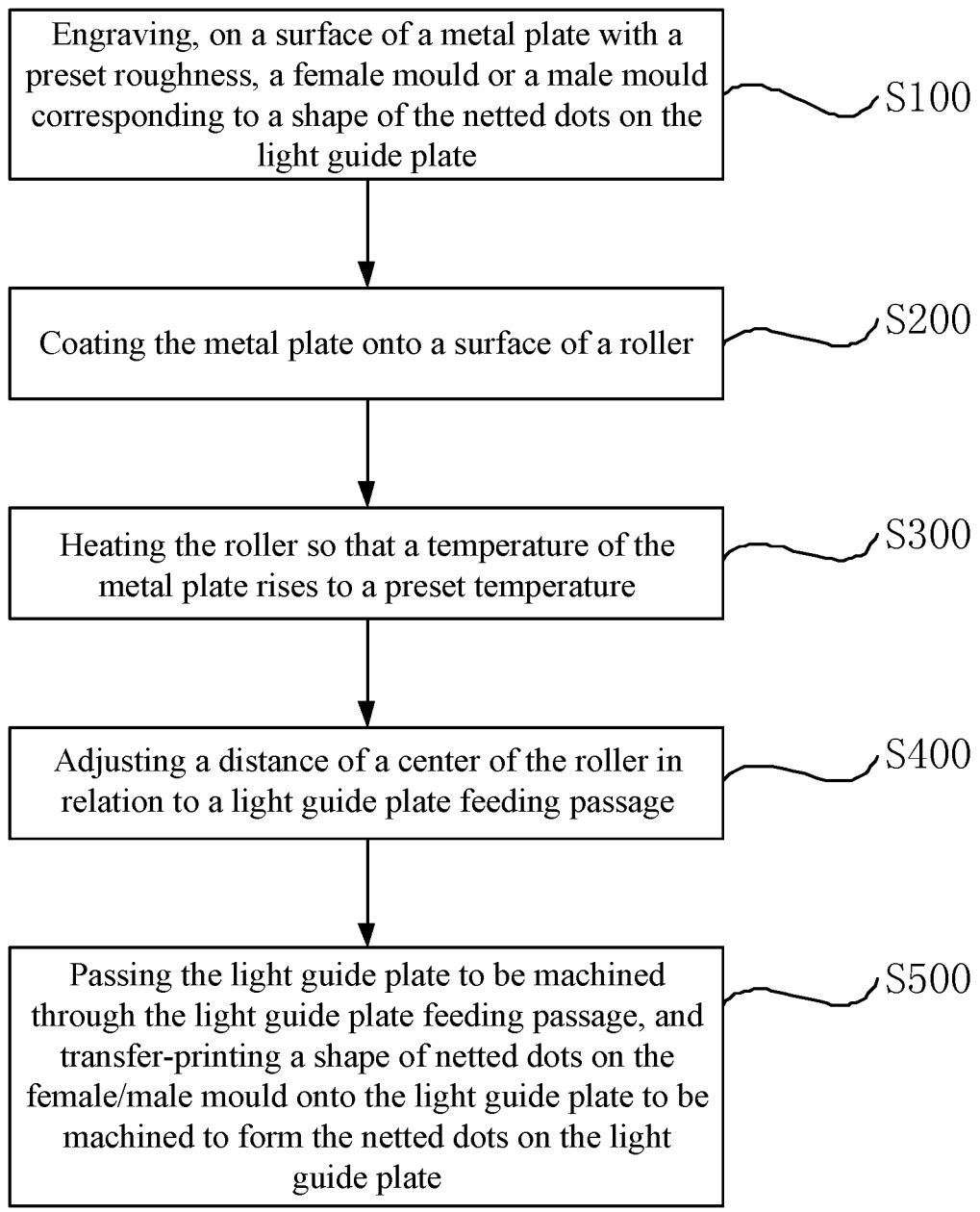
FIG. 1 is a flow diagram illustrating a method for manufacturing netted dots on a light guide plate according to one embodiment of the present disclosure.
Figure 2:
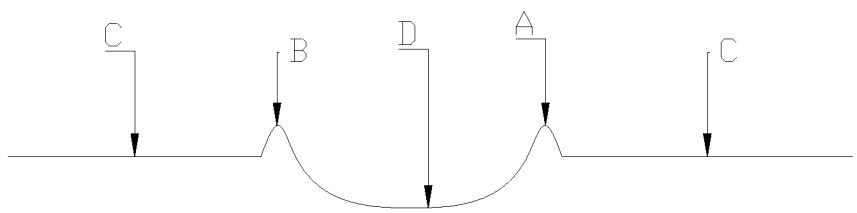
FIG. 2 is a schematic diagram illustrating a cross section of a metal plate which is machined with laser according to one embodiment of the present disclosure.

In a specific embodiment, as illustrated in FIG. 2, the values of heights of the first sharp tooth B and the second sharp tooth A on the cross section of the netted dots of the female mould or the male mould machined with laser are both in a range between 0.5 µm and 15 µm, the value of distance between the inner walls of the first sharp tooth B and the second sharp tooth A is in a range between 10 um and 100 µm, the value of distance between the outer walls of the first sharp tooth B and the second sharp tooth A is in a range between 20 µm and 150 µm, and the value of depth of the concave arc D between the first sharp tooth B and the second sharp tooth A is in a range between 0.5 µm and 100 µm. It is worth noting that the value of depth of the concave arc is measured based on a plane C where the metal plate resides.

Figure 3:
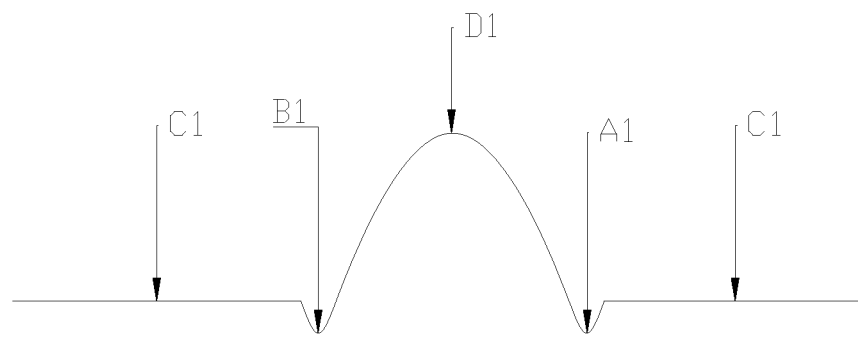
FIG. 3 is a schematic diagram illustrating a cross section of a metal plate which is machined by electroplating according to one embodiment of the present disclosure.

In a specific embodiment, as illustrated in FIG. 3, the values of heights of the first groove B1 and the second groove A1 on the cross section of the netted dots of the female mould or the male mould on the electroplated metal plate are both in the range between 0.1 µm and 15 µm, the value of distance between the bottoms of the parabolic curves of the first groove B1 and the second groove A1 is in a range between 10 µm and 100 µm, the values of distance between the maximum outer walls of the first groove B1 and the second groove A1 are in a range between 20 µm and 150 µm, and the value of height of the parabolic curve D1 is in a range between 0.5 µm and 100 µm. It is worth noting that the value of distance between the bottoms of the parabolic curve D1 and the value of height of the parabolic curve D1 are both obtained by measurement based on the plane C1 where the metal plate resides.

In step S200, the metal plate may be coated onto a surface of a roller 110.

Figure 6:
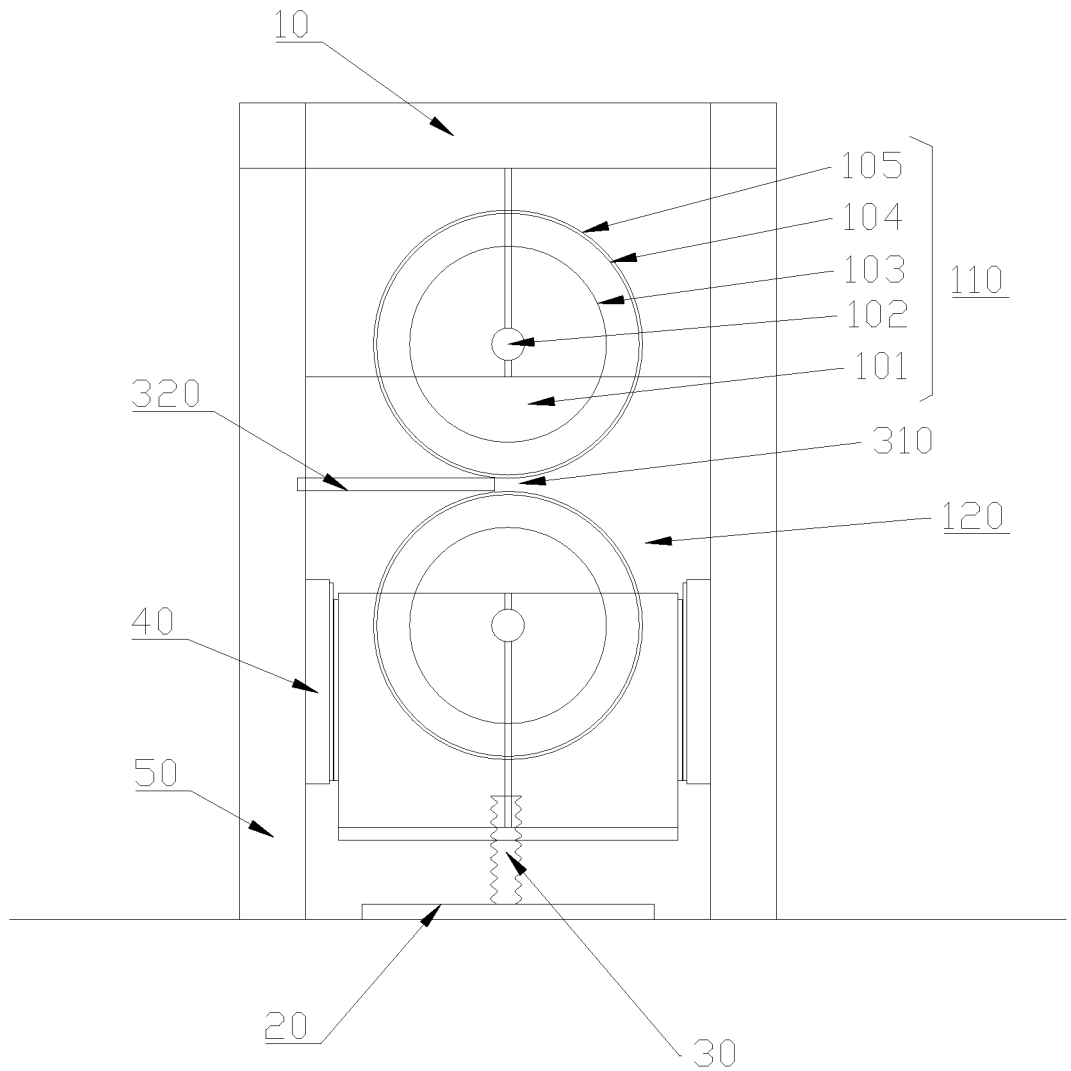
FIG. 6 is a structural schematic diagram illustrating a light guide plate pressing device according to one embodiment of the present disclosure.

As illustrated in FIG. 6, the metal plate with the female mould or the male mould may be coated onto the surfaces of the first roller 110 and the second roller 120, and the coated first roller 110 and the coated second roller 120 may be used to impress a light guide plate 320.

In one embodiment, the first roller 110 and the second roller 120 are generally arranged in stack and are used cooperatively with one another so as to form a light guide plate feeding passage 310. The first roller 110 may be made up of a steel inner layer structure 103 and a steel outer layer structure 104, and may be hollow and provided with a rotation shaft 102. The inner structure of the second roller 120 may be the same as that of the first roller 110.

In step S300, the roller may be heated so that a temperature of the metal plate rises to a preset temperature.

In one embodiment, each roller may be provided with a preheating unit, and 50%-80% of a volume of each roller may be filled with temperature resistant oil.

Specifically, the preheating unit may be heated to a temperature in a range between 40° C. and 150° C., and the temperature resistant oil may be a high temperature resistant oil.

In one specific embodiment, the preheating unit in the first roller 110 may heat the high temperature resistant oil in the roller, and the high temperature resistant oil may heat the steel outer layer structure 104 on the roller to a preset temperature through thermal conduction so as to heat the metal plate to a preset temperature.

In step S400, a distance of a center of the roller in relation to a light guide plate feeding passage 310 may be adjusted.

In one embodiment, at least one of the first roller 110 and the second roller 120 may be provided with a lifting unit configured to adjust the spacing of the light guide plate feeding passage 310.

Specifically, the lifting unit 30 may be a helical lifting unit, and supported by a base 20. The helical lifting unit 30 may be supported on either of the first roller 110 and the second roller 120.

Further, the roller provided with the lifting unit 30 may be equipped with a sliding rail unit 40 for sliding the roller upwardly and downwardly.

In one specific embodiment, the second roller 120 provided with a helical lifting unit 30 may approach the first roller 110, and the distance between the first roller 110 and the second roller 120 may be adjusted to control the preset pressure.

In step S500, the light guide plate 320 to be machined may pass through the light guide plate feeding passage 310, the shape of the netted dots of the female mould or the male mould may be transfer-printed onto the light guide plate 320 to be machined so as to form the netted dots on the light guide plate 320.

As illustrated in FIG. 6, in one embodiment, after the height of the light guide plate feeding passage 310 between the two rollers is adjusted by the lifting unit 30, the light guide plate 320 may pass through the light guide plate feeding passage 310 between two rollers coated with metal plates on which the female mould or the male mould corresponding to the shape of the netted dots on the light guide plate is engraved.

In one embodiment, the light guide plate may pass through the light guide plate feeding passage 310 between two rollers coated with metal plates on which the female mould or the male mould corresponding to the shape of the netted dots on the light guide plate is engraved, and may be further impressed at a preset temperature and a preset pressure.

Figure 4:
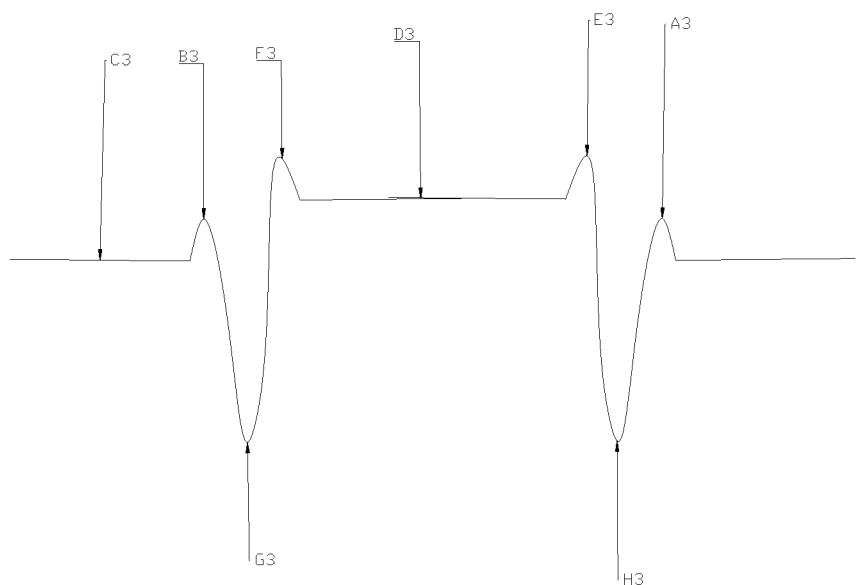
FIG. 4 is a schematic diagram illustrating a cross section of a light guide plate which is impressed by a roller coated with a metal plate that has been machined with laser according to one embodiment of the present disclosure.

In one specific embodiment, after the light guide plate 320 passes through the light guide plate feeding passage 310 between rollers coated with the metal plate machined with laser, each netted dot formed on the light guide plate may have a cross-sectional shape as illustrated in FIG. 4. The cross-sectional shape may include: two sharp teeth B3 and A3 at both ends; two grooves G3 and H3, positioned to be adjacent to the two sharp teeth B3 and A3 respectively, wherein each groove is in a direction of an inner wall of the sharp teeth; and a concave arc D3, positioned between the two grooves G3 and H3 and above a plane C3 of the light guide plate.

Further, the concave arc D3 may also be a straight line.

The values of heights of the first sharp tooth B3 and the second sharp tooth A3 at both ends are both in a range between 0 μm to 0.5 μm, the value of distance between the outer walls of the first sharp tooth B3 and the second sharp tooth A3 is in a range between 35 μm and 70 μm, the values of depths of the first groove G3 and the second groove H3 are in a range between 2 μm and 10 μm, the value of distance between the inner walls of the first groove G3 and the second groove H3 is in a range between 25 μm and 60 μm, and the value of height of the concave arc D3 above the plane C3 where the light guide plate resides is in a range between 0.5 μm and 3 μm. It is worth noting that all the foregoing values are obtained by measurement based on the plane C3 where the light guide plate resides.

Figure 5:
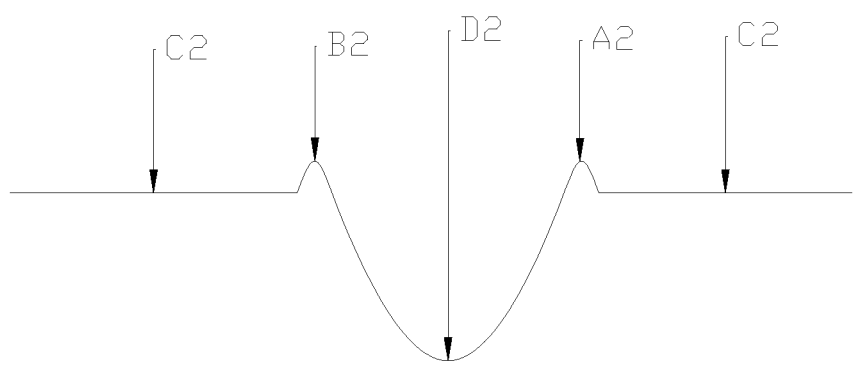
FIG. 5 is a schematic diagram illustrating a cross section of a light guide plate which is impressed by a roller coated with an electroplated metal plate according to one embodiment of the present disclosure.

In one specific embodiment, after the light guide plate 320 passes through the light guide plate feeding passage 310 between rollers 110 coated with electroplated metal plates, each netted dots formed on the light guide plate may have a cross-sectional shape as illustrated in FIG. 5. The cross-sectional shape may include two sharp teeth B2 and A2 and a concave arc D2 provided between the two sharp teeth.

The values of heights of the first sharp tooth B2 and the second sharp tooth A2 are both in a range between 0.5 μm and 15 μm, the value of the distance between inner walls of the first sharp tooth B2 and the second sharp tooth A2 is in a range between 10 μm and 100 μm, and the value of the depth of the concave arc D2 located between the first sharp tooth B2 and the second sharp tooth A2 is in a range between 0.5 μm and 100 μm. It is worth noting that all the foregoing values are obtained by measurement based on the plane C2 in which the light guide plate resides.

In one embodiment, the first roller 110, the second roller 120, the base 20 and the lifting unit 30 are all fixed inside a frame formed by the fixed cross beam 10 and the fixed supports 50.

A device for manufacturing netted dots on the light guide plate is provided. The device may include: a hollow roller, adapted to be filled with oil, provided with a heating unit; and a metal plate coated onto a surface of the roller. A female mould or a male mould corresponding to a shape of netted dots on the light guide plate 320 may be engraved on a surface of the metal plate. There may be two rollers, the two rollers may be stacked, and a light guide plate feeding passage 310 may be formed between the two rollers. At least one of the two rollers is provided with a lifting unit 30 configured to adjust a spacing of the light guide plate feeding passage 310.

In one embodiment, a roller may include a first roller 110 and a second roller 120 for feeding and pressing the light guide plate 320. The two rollers may be both in a hollow structure, provided with a preheating unit and filled with a temperature resistant oil so that the metal plates coated on the rollers are heated to a preset temperature.

In one specific embodiment, the preheating units provided on the first roller 110 and the second roller 120 may be heated to a temperature in a range between 40° C. and 150° C., and the temperature resistant oil may be a high temperature resistant oil. The preheating units in the two rollers 110 may heat the high temperature resistant oil in the roller, and the high temperature resistant oil may heat the steel outer layer structure of the roller to a preset temperature by thermal conduction so as to heat the metal plate to a preset temperature.

In one embodiment, the first roller 110 and the second roller 120 may be generally arranged in stack for cooperative application. At least one of the two rollers may be provided with a lifting unit 30 configured to change the distance between two rollers to adjust the spacing of the light guide plate feeding passage 310.

Specifically, the lifting unit 30 may be a helical lifting unit, and supported by a base 20. The helical lifting unit 30 may support at least one of the first roller 110 and the second roller 120.

Further, the roller provided with the lifting unit 30 may be equipped with a sliding rail unit 40 for sliding the roller upwardly and downwardly.

In one specific embodiment, the second roller 120 provided with a helical lifting unit 30 may approach the first roller 110, the passage between the two rollers may form a light guide plate feeding passage 310, and the object of controlling the preset pressure may be achieved by adjusting the spacing of the light guide plate feeding passage 310.

The metal plate is coated onto the surfaces of the two rollers, and a female mould or a male mould corresponding to a shape of the netted dots on the light guide plate is engraved on the surface of the metal plate for impressing the light guide plate 320.

In one embodiment, the engraving is laser engraving. The netted dots of the female mould or the male mould on the metal plate machined by laser may have a cross-sectional shape including two sharp teeth B and A and a concave arc D provided between two sharp teeth.

In another embodiment, after the female mould or the male mould on the metal plate has been machined by laser, the female mould or the male mould on the metal plate may be continued to be machined by electroplating, the netted dots of the female mould or the male mould on the electroplated metal plate may have a cross-sectional shape includes two grooves B1 and A1 and a parabolic curve D1 provided between two grooves.

Further, the metal plate may be a steel plate or a metal plate made of other materials.

In one specific embodiment, as illustrated in FIG. 2, the values of heights of the first sharp tooth B and the second sharp tooth A on the cross section of the netted dots of the female mould or the male mould machined with laser are both in a range between 0.5 μm and 15 μm, the value of distance between the inner walls of the first sharp tooth B and the second sharp tooth A is in a range between 10 um and 100 μm, the value of distance between the outer walls of the first sharp tooth B and the second sharp tooth A is in a range between 20 μm and 150 μm, and the value of depth of the concave arc D between the first sharp tooth B and the second sharp tooth A is in a range between 0.5 μm and 100 μm. It is worth noting that the value of depth of the concave arc is measured based on a plane C where the metal plate resides.

In a specific embodiment, as illustrated in FIG. 3, the values of heights of the first groove B1 and the second groove A1 on the cross section of the netted dots of the female mould or the male mould on the electroplated metal plate are both in the range between 0.1 μm and 15 μm, the value of distance between the bottoms of the parabolic curves of the first groove B1 and the second groove A1 is in a range between 10 μm and 100 μm, the values of distance between the maximum outer walls of the first groove B1 and the second groove A1 are in a range between 20 μm and 150 μm, and the value of height of the parabolic curve D1 is in a range between 0.5 μm and 100 μm. It is worth noting that the value of distance between the bottoms of the parabolic curve D1 and the value of height of the parabolic curve D1 are both obtained by measurement based on the plane C1 where the metal plate resides.

In one embodiment, the light guide plate may passes through the light guide plate feeding passage 310 between two rollers coated with metal plates on which the female mould or the male mould corresponding to the shape of the netted dots on the light guide plate is engraved, and may be further impressed at a preset temperature and a preset pressure.

In one specific embodiment, after the light guide plate 320 passes through the light guide plate feeding passage 310 between rollers coated with the metal plate machined with laser, each netted dot formed on the light guide plate may have a cross-sectional shape as illustrated in FIG. 4. The cross-sectional shape may include: two sharp teeth B3 and A3 at both ends; two grooves G3 and H3, positioned to be adjacent to the two sharp teeth B3 and A3 respectively, wherein each groove is in a direction of an inner wall of the sharp teeth; and a concave arc D3, positioned between the two grooves G3 and H3 and above a plane C3 of the light guide plate.

Further, the concave arc D3 may also be a straight line.

The values of heights of the first sharp tooth B3 and the second sharp tooth A3 at both ends are both in a range between 0 μm to 0.5 μm, the value of distance between the outer walls of the first sharp tooth B3 and the second sharp tooth A3 is in a range between 35 μm and 70 μm, the values of depths of the first groove G3 and the second groove H3 are in a range between 2 μm and 10 μm, the value of distance between the inner walls of the first groove G3 and the second groove H3 is in a range between 25 μm and 60 μm, and the value of height of the concave arc D3 above the plane C3 where the light guide plate resides is in a range between 0.5 μm and 3 μm. It is worth noting that all the foregoing values are obtained by measurement based on the plane C3 where the light guide plate resides.

In one specific embodiment, after the light guide plate 320 passes through the light guide plate feeding passage 310 between rollers 110 coated with electroplated metal plates, each netted dots formed on the light guide plate may have a cross-sectional shape as illustrated in FIG. 5. The cross-sectional shape may include two sharp teeth B2 and A2 and a concave arc D2 provided between the two sharp teeth.

The values of heights of the first sharp tooth B2 and the second sharp tooth A2 are both in a range between 0.5 μm and 15 μm, the value of the distance between inner walls of the first sharp tooth B2 and the second sharp tooth A2 is in a range between 10 μm and 100 μm, and the value of the depth of the concave arc D2 located between the first sharp tooth B2 and the second sharp tooth A2 is in a range between 0.5 μm and 100 μm. It is worth noting that all the foregoing values are obtained by measurement based on the plane C2 in which the light guide plate resides.

In one embodiment, the first roller 110, the second roller 120, the base 20 and the lifting unit 30 are all fixed inside a frame formed by the fixed cross beam 10 and the fixed supports 50.

A specific application scenario in which the present disclosure is implemented will be described as below.

A female mould or a male mould corresponding to a shape of the netted dots on the light guide plate may be engraved on a surface of a metal plate, and the shape of the netted dots of the female mould or the male mould may be formed either by laser engraving together with or without electroplating. The metal plate may be coated onto the surfaces of the first roller 110 and the second roller 120, a heating unit and a high temperature resistant oil are provided inside each roller. The first roller 110 and the second roller 120 may be preheated to a preset temperature, and the rollers may transmit heat to the metal plate through thermal conduction. Since the first roller 110 and the second roller 120 are arranged in stack, the two rollers may form a light guide plate feeding passage 310. The light guide plate 320 to be machined may be fed through the light guide plate feeding passage 310 between the rollers, wherein the second roller 120 is provided with a lifting unit 30 configured to adjust the spacing of the light guide plate feeding passage 310 to achieve a preset pressure. The light guide plate 320 to be machined may pass through the light guide plate feeding passage 310. The light guide plate may be machined at the preset temperature and the preset pressure to form netted dots with a desirable shape on the light guide plate.

With respect to the above method and device for manufacturing the netted dots on the light guide plate, a female mould or a male mould corresponding to the shape of the netted dots on the light guide plate is engraved on the surface of the metal plate, and the metal plate is coated on the surfaces of the upper and lower rollers. When the temperature of the above two rollers rises to a preset temperature, and the light guide plate passes through a reserved passage between two rollers, the light guide plate is impressed to form netted dots on the light guide plate at a preset temperature and a preset pressure. Such technical method of impressing a light guide plate with a hot pressing process has drastically enhanced production efficiency as compared with the traditional injection molding process in the past. As to the netted dots on the light guide plate as formed by such technical process, a laser processing speed is improved, and the service life of the device and the machined steel plate is also increased dramatically.

The above embodiments are chosen and described in order to explain the principles of the disclosure and their practical application so as to activate others skilled in the art to utilize the disclosure. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for manufacturing netted dots on a light guide plate, comprising:
    engraving, on a surface of a metal plate with a preset roughness, a female mould or a male mould corresponding to a shape of each netted dot on the light guide plate;
    coating the metal plate onto a surface of a roller;
    heating the roller so that a temperature of the metal plate rises to a preset temperature;
    adjusting a distance of a center of the roller in relation to a light guide plate feeding passage so that the metal plate applies a preset pressure onto the light guide plate to be embossed; and making the light guide plate to be embossed pass through the light guide plate feeding passage, wherein the metal plate transfer-prints a shape of netted dots of the female mould or the male mould onto the light guide plate to be embossed at a preset pressure and a preset temperature to form the netted dots on the light guide plate, a cross-sectional shape of each netted dot on the light guide plate comprising:

two sharp teeth at both ends;

two grooves, positioned to be adjacent to the two sharp teeth respectively, wherein each groove is in a direction of an inner wall of the sharp teeth; and a concave arc or a straight line, positioned between the two grooves and above a plane of the light guide plate.

2. The method of claim 1, wherein the metal plate is a steel plate.

3. The method of claim 1, wherein engraving the female mould or the male mould includes:

engraving, on the surface of the metal plate, the female mould or the male mould corresponding to the shape of netted dots on the light guide plate with laser, wherein the metal plate is a steel plate.

4. The method of claim 1, wherein a cross-sectional shape of each netted dot of the female mould or the male mould includes two sharp teeth and a concave arc between the two sharp teeth.

5. The method of claim 1, wherein the roller is hollow and is provided with a heating unit, and 50%-80% of a volume of the roller is filled with oil.

6. The method of claim 1, wherein the preset temperature is in a range between 40° C. and 150° C.

7. The method of claim 1, wherein the roller includes a first roller and a second roller, the first roller and the second roller being stacked, and wherein a light guide plate feeding passage is formed between the first roller and the second roller.

8. The method of claim 1, wherein each sharp tooth has a height in a range between 0 μm and 0.5 μm, a distance between outer walls of two sharp teeth is in a range between 35 μm and 70 μm, each groove has a depth in a range between 2 μm and 10 μm, a distance between inner walls of the two grooves is in a range between 25 μm and 60 μm, and the concave arc or the straight line is higher than the plane of the light guide plate by a value in a range between 0.5 μm and 3 μm.

9. The method of claim 1, further comprising:

electroplating the metal plate to further form a shape of each netted dot of the female mould or the male mould, wherein the shape of each netted dot of the engraved female mould or the male mould corresponds to the shape of the netted dots on the light guide plate.

10. The method of claim 9, wherein a cross-sectional shape of each netted dot on the electroplated female mould or the electroplated male mould includes a parabolic curve provided between the two grooves.

11. The method of claim 9, wherein after the light guide plate to be embossed passes through the light guide plate feeding passage, the cross-sectional shape of each netted dot formed on the light guide plate comprises two sharp teeth and a concave arc between the two sharp teeth.

12. The method of claim 11, wherein each of the two sharp teeth has a height in a range between 0.5 μm and 15 μm, a distance between the two sharp teeth is in a range between 10 μm and 100 μm, and the concave arc between the two sharp teeth has a depth in a range between 0.5 μm and 100 μm with regard to the plane of the light guide plate.

13. A device for manufacturing netted dots on a light guide plate, comprising:

a hollow roller, adapted to be filled with oil and provided with a heating unit; and a metal plate coated onto a surface of the roller, wherein a female mould or a male mould corresponding to a shape of each netted dot on the light guide plate is engraved on a surface of the metal plate, a cross-sectional shape of each netted dot on the light guide plate comprising:

two sharp teeth at both ends;

two grooves, positioned to be adjacent to the two sharp teeth respectively, wherein each groove is in a direction of an inner wall of the sharp teeth; and a concave arc or a straight line, positioned between the two grooves and above a plane of the light guide plate;

wherein there are two rollers, the two rollers are stacked, and a light guide plate feeding passage is formed between the two rollers; and wherein at least one of the two rollers is provided with a lifting unit configured to adjust a spacing of the light guide plate feeding passage.

* * * * *